(12) United States Patent
Koo

(10) Patent No.: US 10,120,356 B2
(45) Date of Patent: Nov. 6, 2018

(54) METHOD FOR VERIFYING ACTUATOR CONTROL DATA

(71) Applicant: Hyundai Motor Company, Seoul (KR)

(72) Inventor: Bon Chang Koo, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 15/391,402

(22) Filed: Dec. 27, 2016

(65) Prior Publication Data

US 2018/0059627 A1   Mar. 1, 2018

(30) Foreign Application Priority Data

Aug. 26, 2016 (KR) .................. 10-2016-0109040

(51) Int. Cl.
 *G05B 17/02* (2006.01)
 *G01M 15/02* (2006.01)

(52) U.S. Cl.
 CPC .............. *G05B 17/02* (2013.01); *G01M 15/02* (2013.01)

(58) Field of Classification Search
 CPC .................................. G05B 17/02; G01M 15/02
 See application file for complete search history.

(56) References Cited

U.S. PATENT DOCUMENTS

| 5,541,832 A | * | 7/1996 | Nakajima | ............... B21B 37/28 700/148 |
| 9,760,073 B2 | * | 9/2017 | Kihas | ..................... G05B 17/02 |
| 2016/0321037 A1 | * | 11/2016 | Ono | ......................... G06F 8/20 |

FOREIGN PATENT DOCUMENTS

| JP | 2006-064411 A | 3/2006 |
| JP | 2008-261793 A | 10/2008 |
| JP | 2009-014406 A | 1/2009 |
| JP | 2015-040762 A | 3/2015 |
| JP | 2016-090499 A | 5/2016 |
| KR | 10-2007-0031559 A | 3/2007 |
| KR | 10-0699673 B1 | 3/2007 |
| KR | 10-2012-0117333 A | 10/2012 |

* cited by examiner

*Primary Examiner* — Bryan Bui
(74) *Attorney, Agent, or Firm* — McDermott Will & Emery LLP

(57) ABSTRACT

A method for verifying actuator control data includes a first operation of transmitting, by a host computer, a plant model to a simulator for verifying actuator control data, a second operation of transmitting, to an engine controller connected to an actuator, an engine simulation information signal of the plant model that is received from the simulator, a third operation of driving, through the engine controller, the actuator according to the engine simulation information signal, receiving, by the engine controller, a feedback signal transmitted from the actuator, transmitting the feedback signal to the host computer, and measuring control data, and a fourth operation of comparing the control data with target control data preset in the host computer and verifying whether the control data is abnormal.

5 Claims, 3 Drawing Sheets

METHOD FOR VERIFYING ACTUATOR CONTROL DATA

CROSS-REFERENCE TO RELATED APPLICATION

This application claims under 35 U.S.C. § 119(a) the benefit of priority to Korean Patent Application No. 10-2016-0109040, filed on Aug. 26, 2016 with the Korean Intellectual Property Office, the entire contents of which are incorporated herein by reference.

TECHNICAL FIELD

The present disclosure relates to a method for verifying actuator control data. More particularly, the present disclosure relates to a method for verifying actuator control data and enabling control data for an actual actuator to be verified using hardware-in-the-loop simulation (NILS).

BACKGROUND

Typically, a hardware-in-the-loop simulation (NILS) device is a device for simulating a hardware device in real time which is difficult to be numerically modeled due to nonlinearity, etc., in a numerical simulation environment, and is a simulation device for complementing possible deficiencies in a vehicle test.

The HILS device may reduce the number of required vehicle tests, may improve the quality of the tests, and accordingly may drastically reduce a vehicle development time and cost by allowing hardware device experiments to be repeatedly performed in an environment similar to an actual situation.

However, a typical HILS device performs a performance test for an environment control unit (ECU) while performing a virtual drive by driving an actuator and accordingly transmits, to an engine controller, only simple simulation signal information without an actual actuator mounted.

In other words, since the HILS device is not able to monitor whether the actual actuator operates and whether an operating signal thereof is transmitted to a plant model, an engine output and a performance behavior, which are output from the plant model, may be different from those of an actual engine. In addition, since an engine model and a vehicle model are not realized in the plant model, the HILS has limitations in that a vehicle driving cycle and engine characteristic values may not be precisely simulated.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

An object of the present disclosure is to provide a method for verifying actuator control data which enables control data for an actuator to be verified using hardware-in-the-loop simulation (NILS) by receiving an actual signal of an engine controller with an actual actuator mounted therein, performing consequent controls, transmitting state information on the actuator to the engine controller at the time of driving the actuator and checking and comparing the state information on the actuator in a host computer.

In one aspect, the present disclosure provides a method for verifying actuator control data, including: a first operation of transmitting, by a host computer, a plant model to a simulator so as to verify actuator control data; a second operation of transmitting, to an engine controller connected to an actual actuator, an engine simulation information signal of the plant model that is received from the simulator; a third operation of driving, through the engine controller, the actuator according to the engine simulation information signal, receiving, by the engine controller, a feedback signal transmitted from the actuator, transmitting the feedback signal to the host computer, and measuring control data; and a fourth operation of comparing the control data with target control data preset in the host computer and verifying whether the control data is abnormal.

The third operation may include transmitting the feedback signal transmitted from the actuator to the plant model and the simulator together with the engine controller.

The fourth operation may include: checking, when a target speed stored in the host computer and an actual vehicle speed are compared and the compared value is determined not to be within a preset range, whether the plant model and the simulator are abnormal.

The fourth operation may include: comparing, when the target speed stored in the host computer and the actual vehicle speed are compared and the compared value is determined to be within the preset range, a preset target actuator position and an actual actuator position.

The fourth operation may include: checking, when the target actuator position stored in the host computer and the actual actuator position are compared and the compared value is determined not to be within a preset range, whether the plant model and the simulator are abnormal.

The fourth operation may include: comparing, when the target actuator position stored in the host computer and the actual actuator position are compared and the compared value is determined to be within the preset range, a preset target actuator position response time and an actual target actuator position response time.

The fourth operation may include: checking, when the target actuator position response time stored in the host computer and the actual target actuator position response time are determined not to be within a preset range, whether the plant model and the simulator are abnormal.

The first operation may include: transmitting engine simulation information, vehicle simulation information, and environmental condition information included in the plant model to the simulator.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline and electric power sources.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
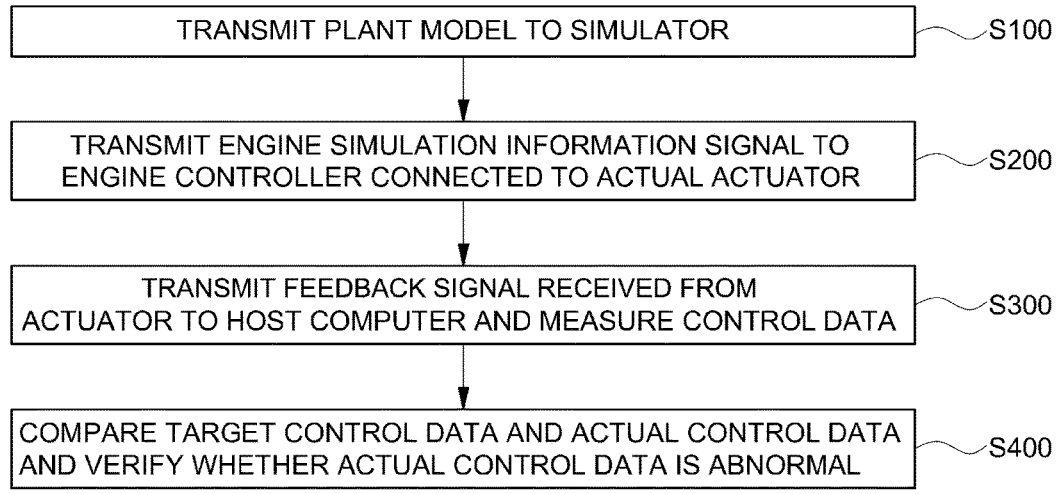
FIG. 1 is a flowchart sequentially showing a method for verifying actuator control data according to exemplary embodiments of the present disclosure.

It should be understood that the appended drawings are not necessarily to scale, presenting a somewhat simplified representation of various features illustrative of the principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the disclosed exemplary embodiments, but also various alternatives, modifications, equivalents and other embodiments, which may be included within the spirit and scope of the disclosure as defined by the appended claims.

Further, in the following detailed description, names of constituents, which are in the same relationship, are divided into "the first," "the second" etc., but the present disclosure is not necessarily limited to such an order in the following description.

In addition, descriptions of known functions and configurations which may make the concepts of the present disclosure unnecessarily obscure will be omitted below.

Figure 2:
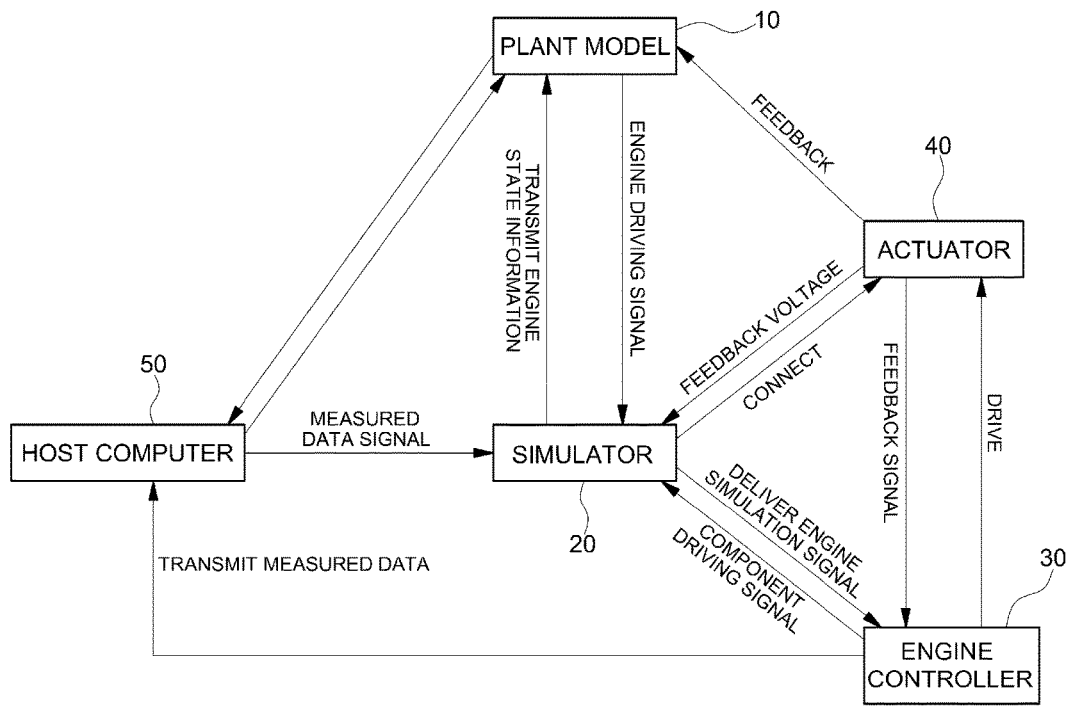
FIG. 2 illustrates a schematic control system for a method for verifying actuator control data according to exemplary embodiments of the present disclosure.

FIG. 1 is a flowchart sequentially showing a method for verifying actuator control data according to embodiments of the present disclosure, and FIG. 2 illustrates a schematic control system for a method for verifying actuator control data according to embodiments of the present disclosure.

Figure 3:
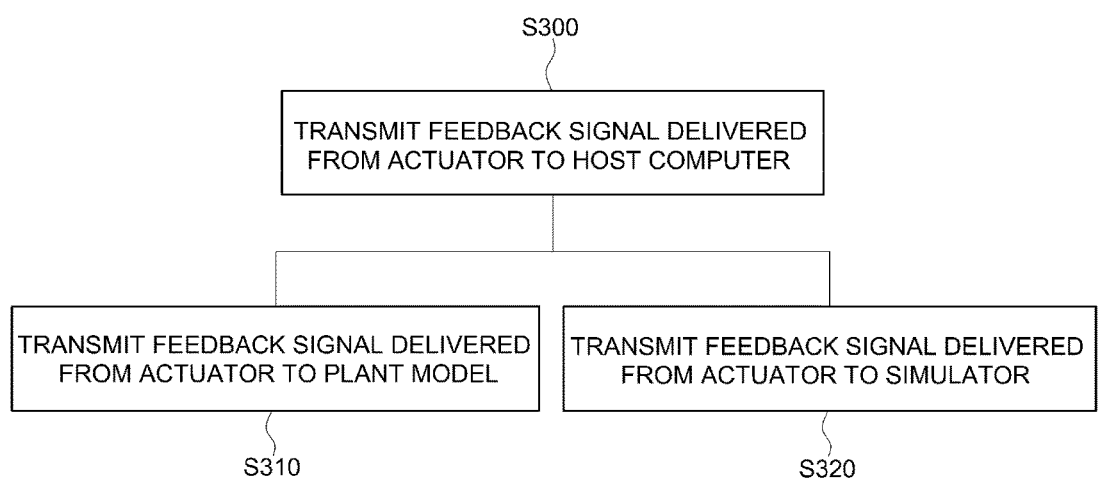
FIG. 3 illustrates a control data measuring step in a method for verifying actuator control data according to exemplary embodiments of the present disclosure.
Figure 4:
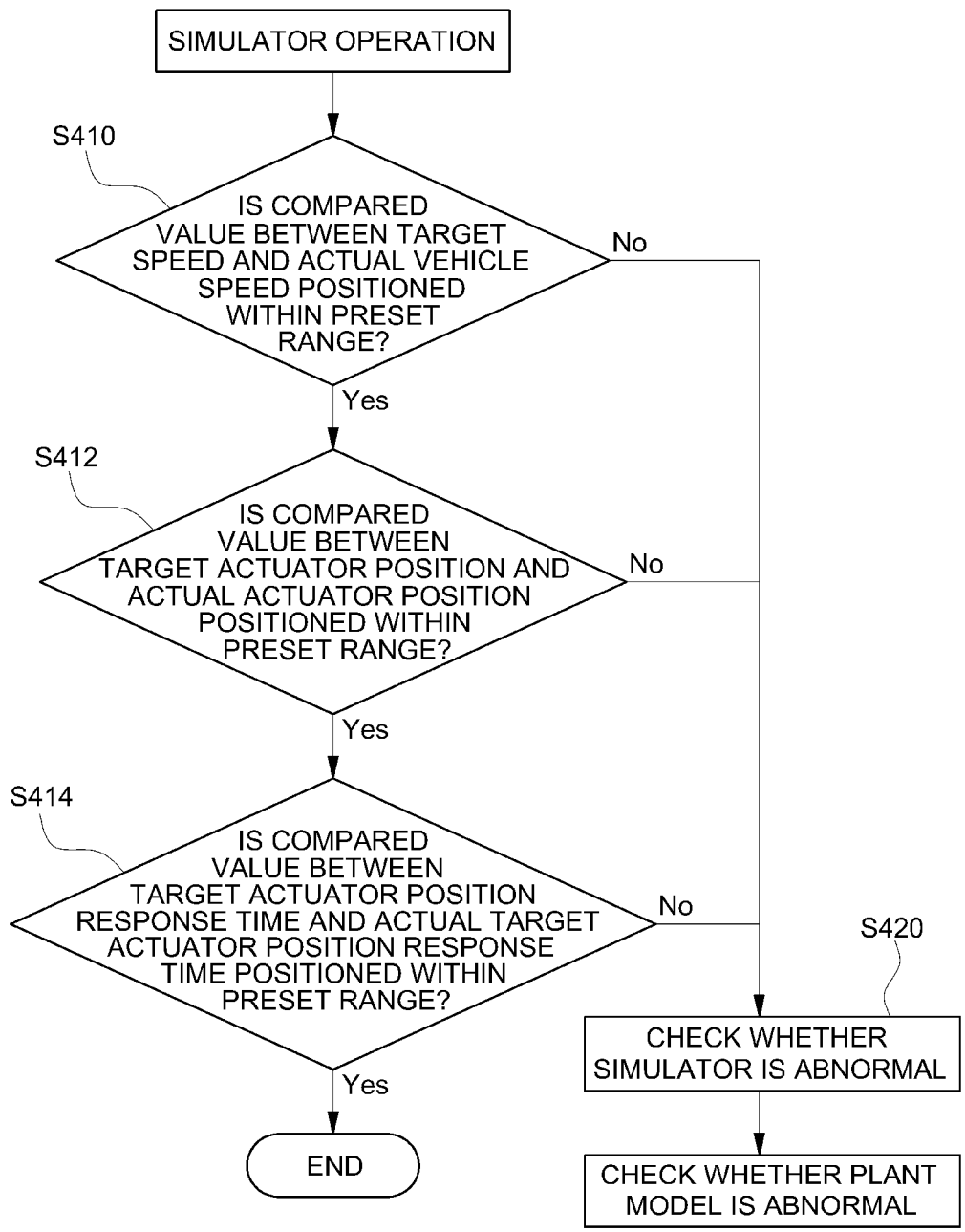
FIG. 4 illustrates a flowchart for verifying whether control data is abnormal according to exemplary embodiments of the present disclosure.

In addition, FIG. 3 illustrates a control data measuring step in a method for verifying actuator control data according to exemplary embodiments of the present disclosure, and FIG. 4 illustrates a step for verifying whether control data is abnormal according to exemplary embodiments of the present disclosure.

As illustrated in FIG. 1, a method for verifying actuator control data will be described as follows.

First, a hardware-in-the-loop simulation (HILS) device is operated for verifying actuator control data in a host computer, which performs virtual driving tests for a vehicle including an engine controller 30 to be tested, an engine, and an environment on the basis of a plant model 10. The plant model 10 including engine simulation information is transmitted to a simulator (at step S100).

In other words, as illustrated in FIG. 2, the HILS device comprises the plant model 10 in which vehicle simulation, engine simulation, and environment conditions, etc., are stored, and further comprises a simulator 20 for transmitting engine state information to the plant model 10 and receiving an engine driving signal from the plant model 10. The simulator 20 may be implemented with a hardware processor having software instructions which cause the processor to perform the described simulator's 20 functions. In this regard, in the present disclosure, not an actuator model but an actual actuator 40 is mounted to receive an actual signal of the engine controller 30 and allow control to be performed by an operation control of the host computer 50.

In other words, in the related art, since the actual actuator 40 is not typically mounted and only simple simulation signal information is transmitted to the engine controller 30, it is difficult, or impossible, to precisely monitor whether the actual actuator 40 is operating.

In addition, since the plant model 10 and the engine controller 30 are not connected to each other in the related art, an operation signal is not transmitted to the plant model 10. This causes an engine model and a vehicle model not to be realized in the plant model 10, and accordingly a vehicle driving cycle and engine characteristic values are not simulated in the plant model 10.

Accordingly, in the present exemplary embodiments, an actual actuator 40 such as an engine injector is mounted as illustrated in FIG. 2 and an operation signal of the actual actuator 40, which is operated by the engine controller 30, is allowed to be transmitted to the plant model 10 of the HILS device. Therefore, an engine output and a performance behavior, which are modeled in the plant model 10, may be allowed to operate similarly, or identically, to an actual engine.

Here, the plant model 10 is for modeling an operation of a virtual engine and since a vehicle model, an engine model and an environment model are realized therein, environment condition information such as engine simulation information, an ambient temperature, a humidity, and an atmospheric pressure may be simulated together as well as vehicle simulation information, in which vehicle driving information such as a vehicle speed and an angular velocity is modeled.

On the other hand, an engine simulation information signal, which is received from the simulator 20 included in the HILS device together with the plant model 10, is transmitted to the engine controller 30 connected to the actual actuator 40 (at step S200).

Thereafter, the actuator 40 is driven through the engine controller 30 according to the engine simulation information signal, and a feedback signal delivered from the actuator 40 is received in the engine controller 30 and then transmitted to the host computer 50 to measure control data (at step S300).

The feedback signal delivered from, or having been delivered from, the actuator 40 is transmitted to the plant model 10 as well as to the engine controller 30 as illustrated in FIG. 3 (at step S310), and a voltage according thereto is transmitted to the simulator 20 (at step S320).

Such steps are for updating conditions of an engine model, a vehicle model, and an environment model, which are modeled in the plant model 10. For example, conditions varying depending on a change in environmental conditions may be updated with the above-described feedback signal to ensure reliability for the plant model 10.

Target control data preset in the host computer 50 is compared with control data delivered from the feedback signal of the engine controller 30 to verify whether the control data is abnormal (at step S400).

For this, first, an ignition device of the vehicle is turned on to start the vehicle through the simulator 20 of the HILS device for verifying control data. Then, when an engine driving signal is received from the plant model 10 and a driving cycle is set, a target speed stored in the host computer 50 is compared with an actual vehicle speed as illustrated in FIG. 4 (at step S410). When it is determined that the compared value is not positioned within a preset range, it is checked whether the plant model 10 and the simulator 20 are abnormal (at step S420).

In this regard, when the target speed stored in the host computer 50 and the actual vehicle speed are compared (at step S410) to determine that the compared value is located within the preset range in the host computer 50, a preset target actuator position is compared with an actual actuator position (at step S412).

When the target actuator position stored in the host computer 50 is compared with the actual actuator position (at step S412) and a position difference is determined not to be within a preset range, it is checked whether the plant model 10 and the simulator 20 are abnormal (at step S420).

When the target actuator position is compared with a position at which the actual actuator is open (at step S412) and an angle difference becomes approximately 10% or higher, it may be determined that an abnormality has occurred in the plant model 10 and the simulator 20.

In addition, when the target actuator position stored in the host computer 50 is compared with the actual actuator position (at step S412) and the position difference is within the preset range, a target actuator position response time preset in the host computer 50 is compared with an actual target actuator position response time (at step S414).

When it is determined that the target actuator position response time stored in the host computer 50 and the actual target actuator position response time are within a preset range, it is determined that an abnormality has not occurred in control data measured in the actual actuator and the HILS test driving is terminated.

However, when the target actuator position response time is compared with the actual target actuator position response time (at step S414) and a difference thereof is determined not to be within a preset range, it is checked whether the plant model 10 and the simulator 20 are abnormal (at step S420).

In other words, for example, when the difference between the target actuator position response time and the actual target actuator position response time is about 1 second or longer, it is determined that an abnormality has occurred in the control data measured in the actual actuator and accordingly it is checked whether the plant model 10 and the simulator 20 are abnormal (at step S420).

Accordingly, in receiving a control signal of the engine controller 30 in which the actual actuator 40 is mounted and accordingly performing a control using the HILS device, a feedback signal according to an operation of the actuator 40 may be transmitted to the engine controller 30 to verify whether there is abnormality in the control data of the actual actuator 40 by comparing the target speed, actuator target position, and target actuator position response time preset in the host computer 50 with corresponding information of the actual actuator 40.

In addition, in the present exemplary embodiments, since vehicle simulation information, engine simulation information, and environmental conditions, which are modeled through the actual actuator 40, are realized in the plant model 10, control data may be verified under various conditions by simulating a deviation of the plant model 10 from an actual engine, road conditions, and characteristic changes depending on a temperature, humidity, and atmospheric pressure, and by allowing verifications thereof to be performed.

The present disclosure enables verification for actuator control data using a hardware-in-the-loop simulation (HILS) device by receiving an actual signal of an engine controller with an actual actuator mounted therein, performing consequent controls, transmitting state information pertaining to an actuator to an engine controller at, or after, a time of driving the actuator, and checking and comparing the state information on the actuator in a host computer.

In addition, the present disclosure is capable of simulating a vehicle driving cycle, an environmental condition, and a usage condition by allowing engine simulation information, vehicle simulation information, and environment simulation information to be included in a plant model such that an engine output and a performance behavior in the plant model operate similarly to those of an actual engine.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for verifying actuator control data, comprising:

transmitting, by a host computer, a plant model to a simulator for verifying actuator control data;

transmitting, to an engine controller connected to an actuator, an engine simulation information signal of the plant model that is received from the simulator;

driving, through the engine controller, the actuator according to the engine simulation information signal, receiving, by the engine controller, a feedback signal transmitted from the actuator at a time of driving the actuator, transmitting the feedback signal to the host computer, and measuring, through the host computer, the actuator control data from the feedback signal; and comparing the actuator control data with target control data preset in the host computer and verifying whether the actuator control data is abnormal, wherein the verifying of whether the actuator control data is abnormal comprises:

comparing a preset target actuator position and an actual actuator position, when the target speed stored in the host computer and the actual vehicle speed are compared and the value resulting from the comparison is determined to be within the preset range;

comparing a preset target actuator position response time and an actual target actuator position response time, when the target actuator position stored in the host computer and the actual actuator position are compared and the value resulting from the comparison is determined to be within the preset range;

checking whether the plant model and the simulator are abnormal, when a difference between the target actuator position response time stored in the host computer and the actual target actuator position response time are determined not to be within a preset range.

2. The method of claim 1, wherein the measuring of the actuator control data comprises:
transmitting the feedback signal transmitted from the actuator to the plant model and the simulator together with the engine controller.

3. The method of claim 1, wherein the verifying of whether the actuator control data is abnormal comprises:
checking whether the plant model and the simulator are abnormal, when a target speed stored in the host computer and an actual vehicle speed are compared and a value resulting from the comparison is determined not to be within a preset range.

4. The method of claim 1, wherein the verifying of whether the actuator control data is abnormal comprises:
checking whether the plant model and the simulator are abnormal, when the target actuator position stored in the host computer and the actual actuator position are compared and a value resulting from the comparison is determined not to be within the preset range.

5. The method of claim 1, wherein the transmitting of the plant model to the simulator comprises:
transmitting engine simulation information, vehicle simulation information and environmental condition information included in the plant model to the simulator.

* * * * *